April 24, 1945.  J. H. EAGLE ET AL  2,374,475
SIGHTING DEVICE
Filed Jan. 17, 1944
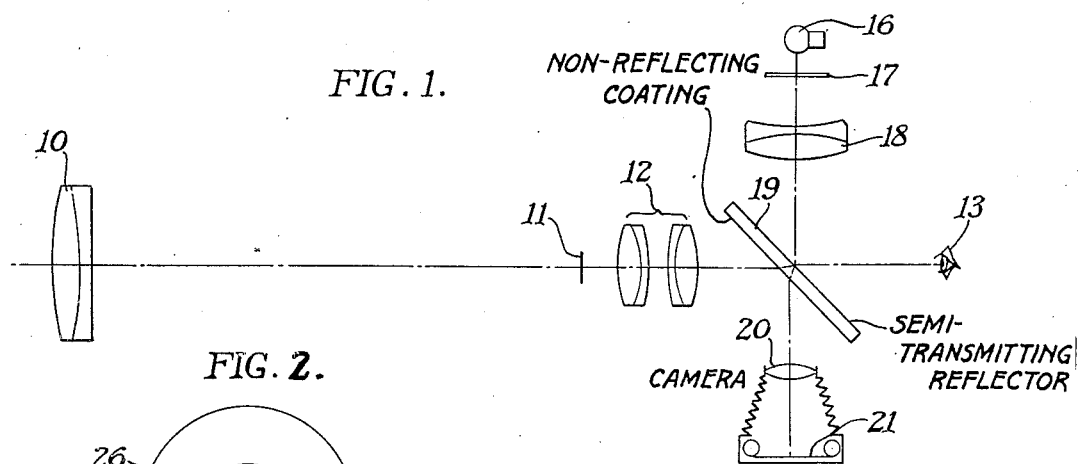
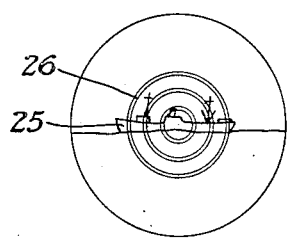
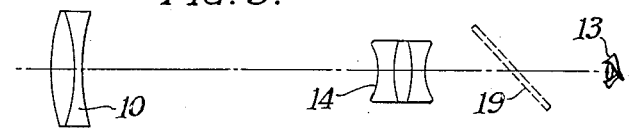
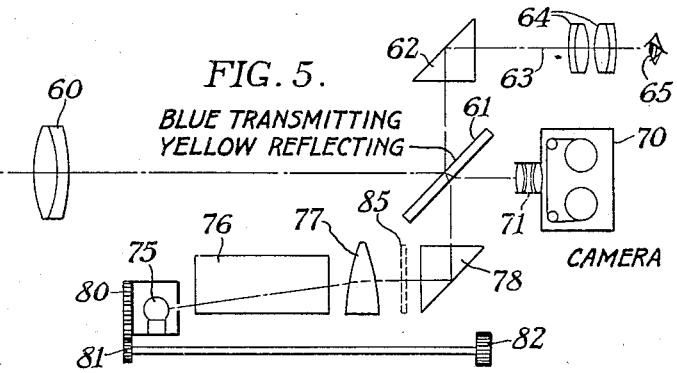
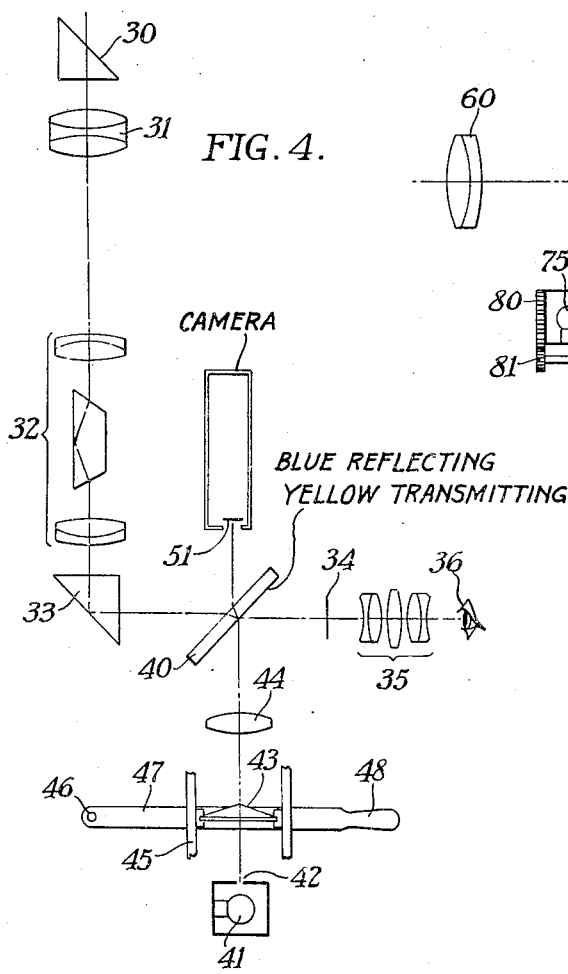
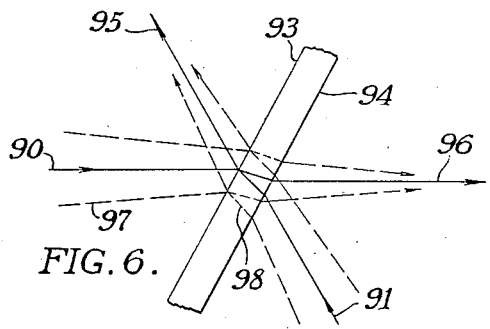
JOHN H. EAGLE
HENRY W. DIRKSEN
WILLIAM D. ORSER
INVENTORS
ATT'Y & AG'T

UNITED STATES PATENT OFFICE 2,374,475

SIGHTING DEVICE

John H. Eagle, Henry W. Dirksen, and William Donald Orser, Rochester, N. Y., assignors to Eastman Kodak Company, Rochester, N. Y., a corporation of New Jersey Application January 17, 1944, Serial No. 518,560

10 Claims. (Cl. 95—18)

This invention relates to sighting devices particularly those in which a fiducial reticle is employed for aiming on a target.

The object of the invention is to provide a simple and accurate arrangement to permit simultaneous viewing and recording of superimposed target and reticle images. The invention is particularly useful when the reticle is of variable diameter for stadiametric range finding such as described in co-pending application Serial No. 489,644, filed June 4, 1943, by Fred E. Altman, now U. S. Patent 2,360,822.

It is the object of one preferred embodiment of the invention to provide a device which combines the light beams from the target and the reticle, permits the eye to see both beams and simultaneously permits the superimposed images as seen by the eye to be photographically recorded and also colors the beams differently so as to distinguish between the target and reticle images. The most preferable arrangement has the images colored differently such as complementary to one another with the main wave length of one color such as yellow or red longer than the main wave length of the other color such as green or blue and presents to the camera a pair of colors interchanged with respect to those presented to the eye. The target image presented to the eye is selected to be the longer wave length such as yellow since this interferes least with the natural appearance of the target; the reticle image presented to the eye is then blue which is of course very distinctive as required for accurate aiming or stadiametric ranging. In this embodiment the target image projected to the camera is blue which records more easily; that is the blue part of the target image is sent to the camera and the yellow part which is of less importance for photographic purposes is sent to the eye. Further in this case the reticle image striking the film in the camera is yellow which does not record as distinctly as the blue target image and hence does not overexpose the film or even tend to interfere with the target image.

According to the invention these objects are obtained by the provision of some form of telescope for receiving light from the target and for sending it to the eye of an observer, some form of illuminated reticle also for sending light to the observer and some form of photographic recording means such as a camera. The light beams from the target and from the illuminated reticle are combined by an optical system which includes a semi-transparent mirror and the simplicity and accuracy of the present invention are provided by the fact that this same semi-transparent mirror acts also for simultaneously splitting each beam, directing a portion to the eye of the observer and another portion to the camera.

Such an arrangement is particularly useful with stadiametric range finders since it permits the reticle to be to one side of the telescope system and since it permits the photographic recording of the setting of the reticle relative to the target, exactly as seen by the observer at all times. Another reason why this particular arrangement finds such great use with stadiametric range finders is that it permits, for example by the color filtering arrangement described below or by suitable arrangement of polarizing filters, the presentation of reticle and target images to the eye of any relative intensity desired for ease and accuracy of view and simultaneously the presentation of similar images, identical to the visible ones except for their relative intensities, to the photographic recorder. Thus the relative intensities of the two images can at the same time be selected in the form most suitable for viewing and in the form most suitable for recording without in any way affecting the relative magnification of the images or the coincidence setting thereof, both of which factors are extremely critical in devices used for aiming and stadiametric range finding.

Thus one preferred embodiment of the invention employs a dichroic mirror and preferably has the mirror arranged to send a long wave length image of the target and a short wave length image of the reticle to the eye and vice versa to the photographic recorder.

To insure that the target and reticle images as combined by this system are simultaneously in focus, the optical system for projecting these separate beams to the beam combiner must be arranged so that the effective vergences of the two beams are equal as they strike the mirror. If the material on both sides of the mirror has the same index of refraction, for example when the mirror surface is between two plates of glass, the two beams striking the mirror surface must then have exactly the same vergence; the term "effective vergence" is merely to take care of the refraction at the surface if the mirror happens to be coated on an air glass surface for example. The term "vergence" is used to cover convergence, divergence, and collimated light which latter may be said to have zero vergence value.

One simple form of the invention has the semitransparent mirror at 45° to the target beam at the point of incidence and in this connection the reticle beam must strike the other side of the mirror also at 45°. In fact if one neglects the refractive effects, i. e., one assumes the mirror to be a thin mirror completely surrounded by air the two incident beams are mirror images of each other. In any case when the refraction of the beams is taken into account they can still be referred to as "effectively" mirror images of each other.

In the embodiment of the invention employing a dichroic mirror the relative intensities of the reticle and target beams can be further controlled by the inclusion of additional filters. In the specific example described above the yellow target image and the blue reticle image going to the eye can have any ratio of intensities by controlling the intensity of the light illuminating the reticle. If a filter is introduced in front of the reticle any reduction of intensity of the reticle image can be corrected by increasing the intensity of illumination. The preferred arrangement includes a blue filter in front of the reticle which in cooperation with the blue absorption of the reticle beam as it is transmitted through the dichroic reflector, very greatly reduces the reticle intensity as it strikes the photographic film. Thus the final photographic record is mainly one of the target with only a very faint outline of the reticle. For some purposes this has been found to be quite a desirable arrangement.

The advantages of the invention and its method of operation will be clearly understood from the following description of certain embodiments thereof, when read in connection with the accompanying drawing in which:

Fig. 1 illustrates diagrammatically an optical system incorporating a simple form of the invention.

Fig. 2 shows the field of view presented to the eye of the observer in Fig. 1.

Fig. 3 shows an alternative telescope arrangement for use in the embodiment shown in Fig. 1.

Fig. 4 shows a periscopic form of stadiametric range finder incorporating the invention.

Fig. 5 shows another form of stadiametric range finder incorporating the invention.

Fig. 6 is given to illustrate some of the optical details involved.

In Fig. 1 the target being sighted is viewed through a terrestrial telescope made up of an objective 10 which forms an image 11 and an eyepiece 12 for viewing this image, which appears as 25 in Fig. 2. In the collimated beam from the eyepiece 12, before it reaches the eye 13 of an observer, there is located a glass plate 19 one surface of which has been provided with a non-reflecting coating and the other surface of which has been provided with a semi-transparent mirror. According to the invention this mirror simultaneously serves two purposes. First, it receives light from a reticle 17 illuminated by a lamp 16, which light is collimated by a lens 18 and directs a portion of this light to the eye at 13 so that the observer sees an image of the reticle 17 imposed on the image of the target 11. This reticle image is shown as 26 in Fig. 2.

Secondly this mirror on 19 splits both the target beam and the reticle beam so that the eye at 13 receives only one portion of each beam. The other portion is directed downward to a camera having a lens 20 which brings the two images to focus on a photographic film 21. Attention is drawn to the fact that the target and reticle beams are both collimated as they strike the mirror and that, except for the refraction of the plate 19 the two beams strike this mirror in the same angle of incidence but from opposite sides. Taking refraction into account, one may say that the beams strike at "effectively" the same angle of incidence.

In Fig. 3 the terrestrial telescope is replaced by a Galilean telescope having a negative eyepiece 14 in place of the positive eyepiece 12 which in Fig. 1 follows the image 11.

In Fig. 4 the target beam is received by a prism 30 and brought to focus by an objective 31 to form an image which is relayed by lenses 32 and a prism 33 to form an image 34 which in turn is viewed through an eyepiece 35 by the eye 36 of an observer. In this embodiment of the invention the semitransparent mirror is located on the surface of a plate 40, optically ahead of the image 34. Light from a lamp 41 illuminates a small hole 42 which, due to a conical lens 43 appears as a circle which circle in turn is imaged by a lens 44 to be superimposed, after reflection at the mirror, on the target image 34. That is, the vergence of the reticle beam falling on the mirror on the plate 40 is effectively equal to that of the target beam at this mirror. The diameter of the reticle circle produced by the conical lens 43 is directly proportional to the separation of the point source 42 and the lens 43. For purposes of stadiametric ranging this conical lens 43 is permitted axial movement by having its mount slidable in guides 45. The axial movement is provided and controlled by a lever 47 pivoted at the point 46 and having a handle 48. That is, the lever 47 is attached to and moves the lens 43 axially as the lever 47 is operated by the observer.

Thus the semitransparent mirror combines both the target beam from the prism 33 and the reticle beam from the lens 44 so that superimposed images are formed at the plane 34. This mirror simultaneously splits both of these beams and sends a portion thereof to a camera whose film plane is located at 51. Since the film plane 51 is optically at the same distance from the mirror as is the image plane 34, no additional lenses are needed in this recorder beam. If for convenience the camera should be closer to the mirror, a positive lens should be included giving an image of reduced size, and on the other hand if the camera should be farther from the mirror a negative lens may be used giving a magnified image.

In this Fig. 4 the semitransparent mirror used is dichroic, transmitting yellow and reflecting blue. Thus the eye sees a yellow target image with a bright blue reticle superimposed thereon, the target image thus appearing practically in its normal colors since yellow does not greatly distort natural colors, at least as far as the eye is concerned. Similarly the camera receives a blue target image which photographs well and a yellow reticle image which, as desired, photographs much less intensely than the blue target image.

In Fig. 5 the arrangement is in a sense reversed so that the telescope system for viewing the target includes reflection at the semitransparent mirror. Thus light is received and focused by an objective 60 reflected by a yellow-reflecting blue-transmitting mirror 61, one portion of the light being reflected by prism 62 to form an image 63 which is viewed through an eyepiece 64 by the eye of an observer, 65. The other portion of the light is transmitted to a camera 70 and brought to focus by a lens 71 thereof. A variable diameter reticle is provided in accordance with the invention of Fred E. Altman mentioned above by means of a lamp 75 which illuminates a slit adjacent to the roof of a dihedral prism 76 which acts as a kaleidoscope to form a closed figure or pattern of this slit of light. The light from this pattern is deviated and focused by a lens 77 and a prism 78 to strike the mirror 61, effectively at the same vergence as the target beam and to form an image of the reticle at the point 63 superimposed on the target image. Similarly the camera 70 receives superimposed images of the target and reticle. The diameter of the reticle is adjusted by moving the slit and the light source 75 which is carried on a rack 80 driven by a pinion 81, which may be rotated by a suitable knob such as 82.

In this case the mirror is made blue-transmitting and yellow-reflecting, so that once again the eye receives a long wave length image of the target and a short wave length image of the reticle whereas the camera receives the opposite images. Further to reduce the intensity of the reticle relative to the intensity of the target image as it strikes the camera 70, without appreciably reducing the intensity ratio of the two images as they strike the eye 65, a bluish filter 85 is included in the reticle beam.

Fig. 6 is included mainly to explain the meanings of "effectively equal vergence" and "effectively mirror images." Since the orientation of the semitransparent mirror in any embodiment of the invention need not be exactly at 45° to the target and reticle beams, this Fig. 6 is shown at a more generally selected angle. The target and reticle beams represented by lines 90 and 91, either line representing either beam, arrive at the semireflecting surface 93 of a glass plate. The outgoing beams 95 and 96 from this surface contain a portion of each of the beams 90 and 91. Except for the refraction within the plate, i. e., at the surfaces 93 and 94, the two beams 90 and 91 are mirror images of each other. In fact if another layer of glass were included so that the surface 93 were between two such layers and if the beams were considered only immediately adjacent to this surface, the incident beams would be exact mirror images of each other. Another way of looking at it is that the ray 95 is the ray 91 after refraction through the plate and the ray 90 is selected so that when reflected it coincides with this ray 95. Similarly the vergence of the beam whose principal ray is shown at 90, must be effectively equal to the vergence of the beam 91 so that the outgoing beams have exactly the same vergence. This is represented by broken lines 97 and 98. Except in the case of collimated light the actual vergence represented by lines 97 is different from that represented by lines 98 due to the refraction at the surfaces 93 and 94. However these two beams after they are respectively reflected and transmitted by the surface 93 coincide exactly. Thus the incident beams have effectively equal vergence as the term is used in this specification.

Having thus described various preferred embodiments of our invention, and pointed out how it is particularly useful with stadiametric range finders, we wish to point out that the invention is not limited to these structures, but is of the scope of the appended claims.

What we claim and desire to secure by Letters Patent of the United States is:

1. A sighting device for viewing a target comprising a telescopic optical system for receiving light from the target and for presenting an image thereof to the eye of an observer, an illuminated reticle, photographic recording means and means including a single semi-transparent semi-reflecting mirror for combining light beams from the target and from the reticle to form superimposed images and also for simultaneously splitting each beam directing a portion to the eye of the observer and another portion to the photographic recording means.

2. A device according to claim 1 in which the reticle is a variable diameter one for stadiametric ranging.

3. A device according to claim 1 in which said mirror is dichroic reflecting and transmitting different colors.

4. A device according to claim 1 in which said mirror reflects and transmits complementary colors one of longer mean wavelength than the other and said beam combining and splitting means is arranged to send to the eye the longer wavelength image of the target and the shorter wavelength image of the reticle and to send to the photographic recording means the other images of the target and reticle.

5. A device according to claim 1 in which the effective vergence of the target beam equals that of the reticle beam as they strike said mirror.

6. A sighting device for viewing a target comprising a telescope for receiving a light beam from the target and for presenting an image thereof to the eye of an observer, a semi-transparent semi-reflecting mirror positioned diagonally to intercept the target beam and to direct one portion thereof to the eye, photographic recording means positioned to receive another portion of the target beam from the mirror, an illuminated reticle to one side of the telescope system and optical means for receiving a light beam from the reticle and for directing it onto the mirror from a direction which is effectively the mirror image of the incident target beam and with the same effective vergence as the target beam whereby target and reticle images appear superimposed both to the eye and to the photographic recording means.

7. A device according to claim 6 in which the mirror is dichroic reflecting and transmitting different colors one of longer mean wavelength than the other and is arranged so that the portions of the target and reticle beams going to the eye are respectively of the longer and shorter wavelength colors.

8. A device according to claim 6 in which the mirror is dichroic reflecting and transmitting different colors and a color filter is included in the reticle beam between the reticle and the mirror to reduce the intensity of the portion of the reticle beam going to the photographic recording means.

9. A device according to claim 6 in which the mirror reflects blue and transmits yellow, the transmitted and reflected portions respectively of the target and reticle beams go to the eye and the photographic recording means is positioned to receive the target beam as reflected and the reticle beam as transmitted.

10. A device according to claim 6 in which the mirror transmits blue and reflects yellow, the reflected and transmitted portions respectively of the target and reticle beams go to the eye and and the photographic recording means is positioned to receive the target beam as transmitted and the reticle beam as reflected.

JOHN H. EAGLE.
HENRY W. DIRKSEN.
WILLIAM DONALD ORSER.